(12) United States Patent
Katdare et al.

(10) Patent No.: US 11,663,114 B2
(45) Date of Patent: May 30, 2023

(54) METHOD AND SYSTEM FOR AUTOMATICALLY TESTING EVENT-DRIVEN MICROSERVICES

(71) Applicant: JPMorgan Chase Bank, N.A., New York, NY (US)

(72) Inventors: Amol R. Katdare, Plano, TX (US); Michael Tinker, Richardson, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 16/929,529

(22) Filed: Jul. 15, 2020

(65) Prior Publication Data
US 2022/0019520 A1   Jan. 20, 2022

(51) Int. Cl.
*G06F 11/36* (2006.01)

(52) U.S. Cl.
CPC ...... *G06F 11/3688* (2013.01); *G06F 11/3664* (2013.01); *G06F 11/3684* (2013.01); *G06F 11/3692* (2013.01)

(58) Field of Classification Search
CPC . G06F 11/30–3495; G06F 11/36–3696; G06F 9/542
See application file for complete search history.

(56) References Cited

U.S. PATENT DOCUMENTS

| | | | | |
|---|---|---|---|---|
| 5,566,337 A * | 10/1996 | Szymanski | ............. | G06F 9/542 710/260 |
| 6,993,747 B1 * | 1/2006 | Friedman | ................ | G06F 11/36 714/E11.207 |
| 7,177,925 B2 * | 2/2007 | Carcido | .................. | G06F 9/542 712/228 |
| 8,191,048 B2 * | 5/2012 | Parthasarathy | ......... | H04L 43/50 717/126 |
| 10,026,053 B1 * | 7/2018 | Narayan | ................. | G06F 17/18 |
| 10,423,521 B2 * | 9/2019 | Sharma | ............... | G06F 11/3688 |

(Continued)

OTHER PUBLICATIONS

Jakubiak, N., "How to Approach Testing for Microservices" Dzone [online], 2018 [retrieved Jun. 17, 2021], Retrieved from Internet: < URL: https://web.archive.org/web/20180718155611/https://dzone.com/articles/how-to-approach-testing-for-microservices>, pp. 1-8.*

(Continued)

*Primary Examiner* — Todd Aguilera
(74) *Attorney, Agent, or Firm* — Greenblum & Bernstein, P.L.C.

(57) ABSTRACT

A method for facilitating automated testing of event-driven microservices is provided. The method includes receiving a scenario that includes a set of instructions to test a microservice; automatically generating, based on the scenario, a production event relating to an action to be performed and a consumption event relating to a record of the performed action; automatically generating a first test event using the production event; outputting the first test event to the microservice; automatically retrieving a first result relating to the execution of the first test event by the microservice by using the consumption event; and validating the first result based on the scenario. The method further includes displaying the first result and a notification on a graphical user interface based on an outcome of the validating.

20 Claims, 8 Drawing Sheets

(56) References Cited

U.S. PATENT DOCUMENTS

| | | | | |
|---|---|---|---|---|
| 10,681,164 B2* | 6/2020 | Ruiz-Meraz | ........ | H04L 12/1859 |
| 2004/0205773 A1* | 10/2004 | Carcido | .................. | G06F 9/542 |
| | | | | 719/318 |
| 2006/0265492 A1* | 11/2006 | Morris | .................. | G06F 11/273 |
| | | | | 709/227 |
| 2010/0131928 A1* | 5/2010 | Parthasarathy | ..... | G06F 11/3664 |
| | | | | 717/126 |
| 2015/0378865 A1* | 12/2015 | Robertson | ........... | G06F 11/0709 |
| | | | | 714/57 |
| 2018/0204150 A1* | 7/2018 | Narayan | .................. | G06F 17/18 |
| 2019/0065349 A1* | 2/2019 | Sharma | ............... | G06F 11/3684 |
| 2019/0342412 A1* | 11/2019 | Ruiz-Meraz | ........ | H04L 67/2823 |
| 2020/0257680 A1* | 8/2020 | Danyi | ................. | G06F 11/3409 |

OTHER PUBLICATIONS

Pavan, "Simple Way to Implement Kafka with Java", opencodez [online], 2017 [retrieved Jun. 18, 2021], Retrieved from Internet: < URL: https://www.opencodez.com/java/using-apache-kafka-java.htm>, pp. 1-6.*

* cited by examiner

METHOD AND SYSTEM FOR AUTOMATICALLY TESTING EVENT-DRIVEN MICROSERVICES

BACKGROUND

1. Field of the Disclosure

This technology generally relates to methods and systems for testing microservices, and more particularly to methods and systems for providing a standardized tool for automated testing of event-driven microservices in multi-application choreographies.

2. Background Information

Many modern business entities operate vast global information networks that utilize complex choreographies of microservices to perform numerous business functions. The microservices utilize event-driven mechanisms to interface and communicate with other networked systems. Historically, testing of these event-driven microservices have resulted in varying degrees of success with respect to the development and deployment of microservices due to testing inefficiencies.

One drawback of using conventional testing techniques is that, in many instances, developers must build custom code to test each event-driven microservice. As a result, a large portion of a developer's time must be dedicated to writing the custom test codes. In addition, with each developer writing their own custom code to test each event-driven microservice, the integration of each developer's microservice into a multi-application choreography is much more likely to include errors and security gaps.

Therefore, there is a need for a standardized tool to automate the testing of event-driven microservices during development as well as after deployment in large multi-application choreographies.

SUMMARY

The present disclosure, through one or more of its various aspects, embodiments, and/or specific features or sub-components, provides, inter alia, various systems, servers, devices, methods, media, programs, and platforms for providing a standardized tool for automated testing of event-driven microservices in multi-application choreographies.

According to an aspect of the present disclosure, a method for facilitating automated testing of event-driven microservices is provided. The method is implemented by at least one processor. The method may include receiving at least one scenario that includes at least one set of instructions to test at least one microservice; automatically generating, based on the at least one scenario, at least one production event relating to at least one action to be performed and at least one consumption event relating to at least one record of the performed action; automatically generating, by using the at least one production event, at least one first test event; outputting the at least one first test event to the at least one microservice; automatically retrieving, by using the at least one consumption event, at least one first result relating to the execution of the at least one first test event by the at least one microservice; and validating the at least one first result based on the at least one scenario.

In accordance with an exemplary embodiment, the method may further comprise displaying, via a graphical user interface, the at least one first result and at least one notification based on an outcome of the validating.

In accordance with an exemplary embodiment, the method may further comprise displaying, via a graphical user interface, a choreography of the at least one microservice that is generated based on the at least one first result, the choreography including derived dependencies and interactions between the at least one microservice and other microservices.

In accordance with an exemplary embodiment, the method may further include automatically generating, by using the at least one production event, at least one second test event based on a predetermined schedule; outputting the at least one second test event to the at least one microservice; automatically retrieving, by using the at least one consumption event, at least one second result relating to the execution of the at least one second test event by the at least one microservice; and validating the at least one second result based on the at least one scenario.

In accordance with an exemplary embodiment, the method may further include storing an outcome of the validating in a log corresponding to the at least one scenario; and displaying, via a graphical user interface, the log.

In accordance with an exemplary embodiment, the predetermined schedule may include at least one from among an intermittent schedule and a periodic schedule.

In accordance with an exemplary embodiment, the method may further include automatically generating, by using the at least one production event, a plurality of third test events; outputting the plurality of third test events to the at least one microservice; retrieving a measurement of at least one parameter relating to performance of the at least one microservice; and storing the measurement in an electronic document corresponding to the at least one scenario.

In accordance with an exemplary embodiment, the at least one first result and the measurement may be displayed on a graphical user interface.

In accordance with an exemplary embodiment, the at least one scenario may include at least one operational situation to test the at least one microservice, the operational situation may include a postulated sequence of procedures for the at least one microservice.

In accordance with an exemplary embodiment, the at least one scenario may be received via at least one from among a hypertext transfer protocol and an application programing interface.

According to an aspect of the present disclosure, a computing device configured to implement an execution of a method for facilitating automated testing of event-driven microservices is provided. The computing device comprising a processor; a memory; and a communication interface coupled to each of the processor and the memory, wherein the processor may be configured to: receive at least one scenario that includes at least one set of instructions to test at least one microservice; automatically generate, based on the at least one scenario, at least one production event relating to at least one action to be performed and at least one consumption event relating to at least one record of the performed action; automatically generate, by using the at least one production event, at least one first test event; output the at least one first test event to the at least one microservice; automatically retrieve, by using the at least one consumption event, at least one first result relating to the execution of the at least one test event by the at least one microservice; and validate the at least one first result based on the at least one scenario.

In accordance with an exemplary embodiment, the processor may be further configured to display, via a graphical user interface, the at least one first result and at least one notification based on an outcome of the validating.

In accordance with an exemplary embodiment, the processor may be further configured to display, via a graphical user interface, at least one visualization relating to a choreography of the at least one microservice based on the at least one first result, the choreography may include derived dependencies and interactions between the at least one microservice and other microservices.

In accordance with an exemplary embodiment, the processor may be further configured to automatically generate, by using the at least one production event, at least one second test event based on a predetermined schedule; output the at least one second test event to the at least one microservice; automatically retrieve, by using the at least one consumption event, at least one second result relating to the execution of the at least one second test event by the at least one microservice; and validate the at least one second result based on the at least one scenario.

In accordance with an exemplary embodiment, the processor may be further configured to store an outcome of the validating in a log corresponding to the at least one scenario; and display, via a graphical user interface, the log.

In accordance with an exemplary embodiment, the predetermined schedule may include at least one from among an intermittent schedule and a periodic schedule.

In accordance with an exemplary embodiment, the processor may be further configured to automatically generate, by using the at least one production event, a plurality of third test events; output the plurality of third test events to the at least one microservice; retrieve a measurement of at least one parameter relating to performance of the at least one microservice; and store the measurement in an electronic document corresponding to the at least one scenario.

In accordance with an exemplary embodiment, the processor may be further configured to display, via a graphical user interface, the at least one first result and the measurement.

In accordance with an exemplary embodiment, the at least one scenario may include at least one operational situation to test the at least one microservice, the operational situation may include a postulated sequence of procedures for the at least one microservice.

In accordance with an exemplary embodiment, the processor may be further configured to receive the at least one scenario via at least one from among a hypertext transfer protocol and an application programing interface.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
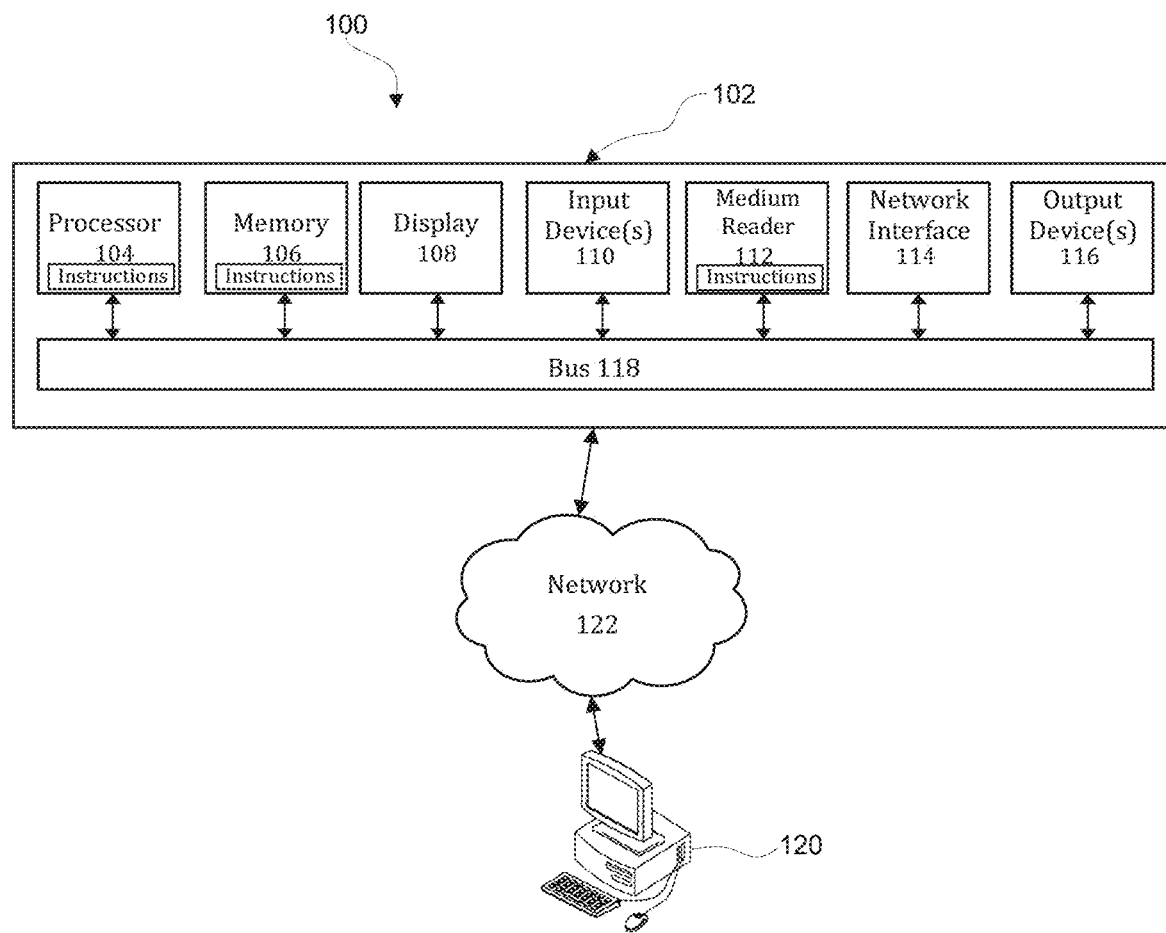
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for providing a standardized tool for automated testing of event-driven microservices in multi-application choreographies.

Figure 2:
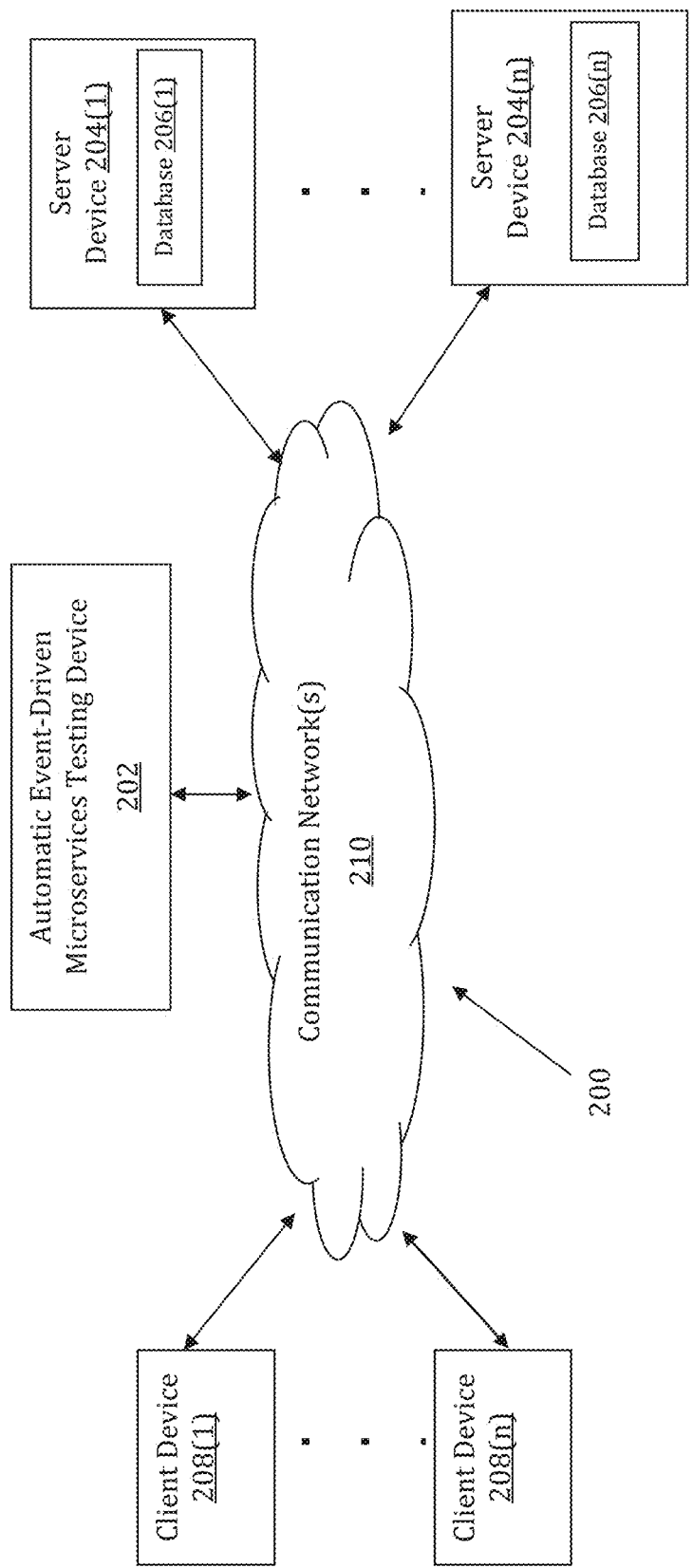
FIG. 2 illustrates an exemplary diagram of a network environment.

Referring to FIG. 2, a schematic of an exemplary network environment 200 for implementing a method for providing a standardized tool for automated testing of event-driven microservices in multi-application choreographies is illustrated. In an exemplary embodiment, the method is executable on any networked computer platform, such as, for example, a personal computer (PC).

The method for providing a standardized tool for automated testing of event-driven microservices in multi-application choreographies may be implemented by an Automatic Event-Driven Microservices Testing (AEMT) device 202. The AEMT device 202 may be the same or similar to the computer system 102 as described with respect to FIG. 1. The AEMT device 202 may store one or more applications that can include executable instructions that, when executed by the AEMT device 202, cause the AEMT device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the AEMT device 202 itself, may be located in virtual server(s) running in a cloud-based computing environment rather than being tied to one or more specific physical network computing devices. Also, the application(s) may be running in one or more virtual machines (VMs) executing on the AEMT device 202. Additionally, in one or more embodiments of this technology, virtual machine(s) running on the AEMT device 202 may be managed or supervised by a hypervisor.

In the network environment 200 of FIG. 2, the AEMT device 202 is coupled to a plurality of server devices 204(1)-204(n) that hosts a plurality of databases 206(1)-206(n), and also to a plurality of client devices 208(1)-208(n) via communication network(s) 210. A communication interface of the AEMT device 202, such as the network interface 114 of the computer system 102 of FIG. 1, operatively couples and communicates between the AEMT device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the AEMT device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and AEMT devices that efficiently implement a method for providing a standardized tool for automated testing of event-driven microservices in multi-application choreographies.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The AEMT device 202 may be a standalone device or integrated with one or more other devices or apparatuses, such as one or more of the server devices 204(1)-204(n), for example. In one particular example, the AEMT device 202 may include or be hosted by one of the server devices 204(1)-204(n), and other arrangements are also possible. Moreover, one or more of the devices of the AEMT device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the AEMT device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to received scenarios and corresponding log documents, generated production events, generated consumption events, and generated test events.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the AEMT device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the AEMT device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the AEMT device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the AEMT device 202, the server devices 204(1)-204(n), or the client devices 208(1)-208(n), for example, may be configured to operate as virtual instances on the same physical machine. In other words, one or more of the AEMT device 202, the server devices 204(1)-204(n), or the client devices 208(1)-208(n) may operate on the same physical device rather than as separate devices communicating through communication network(s) 210. Additionally, there may be more or fewer AEMT devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
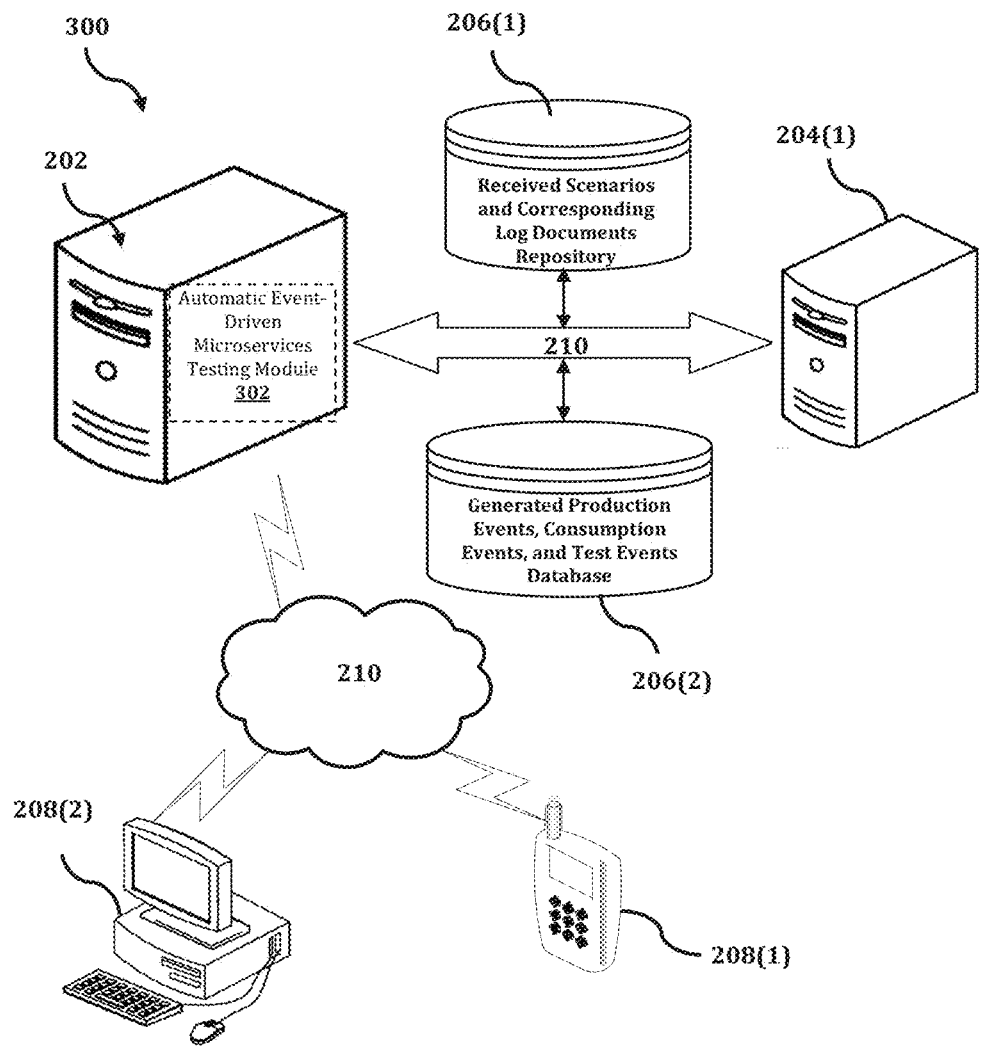
FIG. 3 shows an exemplary system for implementing a method for providing a standardized tool for automated testing of event-driven microservices in multi-application choreographies.

The AEMT device 202 is described and shown in FIG. 3 as including an automatic event-driven microservices testing module 302, although it may include other rules, policies, modules, databases, or applications, for example. As will be described below, the automatic event-driven microservices testing module 302 is configured to implement a method for providing a standardized tool for automated testing of event-driven microservices in multi-application choreographies.

An exemplary process 300 for implementing a mechanism for providing a standardized tool for automated testing of event-driven microservices in multi-application choreographies by utilizing the network environment of FIG. 2 is shown as being executed in FIG. 3. Specifically, a first client device 208(1) and a second client device 208(2) are illustrated as being in communication with AEMT device 202. In this regard, the first client device 208(1) and the second client device 208(2) may be "clients" of the AEMT device 202 and are described herein as such. Nevertheless, it is to be known and understood that the first client device 208(1) and/or the second client device 208(2) need not necessarily be "clients" of the AEMT device 202, or any entity described in association therewith herein. Any additional or alternative relationship may exist between either or both of the first client device 208(1) and the second client device 208(2) and the AEMT device 202, or no relationship may exist.

Further, AEMT device 202 is illustrated as being able to access a received scenarios and corresponding log documents repository 206(1) and a generated production events, consumption events, and test events database 206(2). The automatic event-driven microservices testing module 302 may be configured to access these databases for implementing a method for providing a standardized tool for automated testing of event-driven microservices in multi-application choreographies.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the AEMT device 202 via broadband or cellular communication. Of course, these embodiments are merely exemplary and are not limiting or exhaustive.

Upon being started, the automatic event-driven microservices testing module 302 executes a process for providing a standardized tool for automated testing of event-driven microservices in multi-application choreographies. An exemplary process for providing a standardized tool for automated testing of event-driven microservices in multi-application choreographies is generally indicated at flowchart 400 in FIG. 4.

Figure 4:
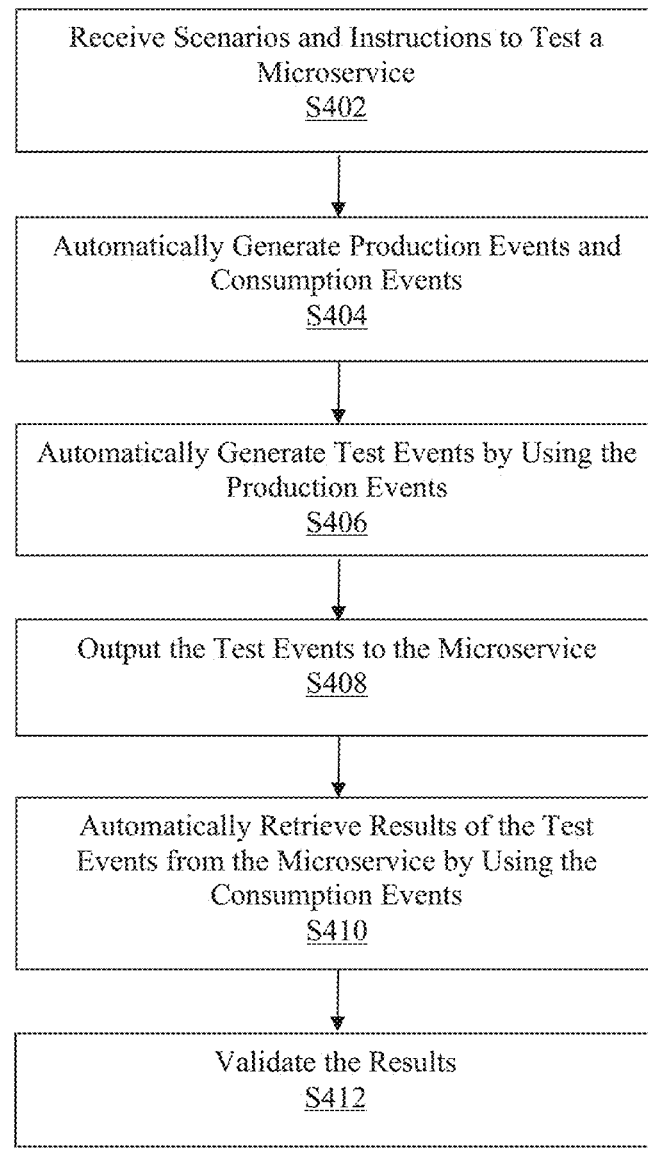
FIG. 4 is a flowchart of an exemplary process for implementing a method for providing a standardized tool for automated testing of event-driven microservices in multi-application choreographies.

In the process 400 of FIG. 4, at step S402, a scenario that includes a set of instructions to test a microservice may be received. In an exemplary embodiment, a microservice may include a unique service and a unique process that communicates with other services and processes over a network to fulfill a goal. The microservice may be independently deployable and organized around business capabilities. In another exemplary embodiment, the microservices may relate to a software development architecture such as, for example, an event-driven architecture made up of event producers and event consumers in a loosely coupled choreography. The event producer may detect or sense an event such as, for example, a significant occurrence or change in state for system hardware or software and represent the event as a message. The event message may then be transmitted to the event consumer via event channels for processing. In another exemplary embodiment, the event-driven architecture may include a distributed data streaming platform such as, for example, Apache Kafka for the publishing, subscribing, storing, and processing of event streams in real time. As will be appreciated by a person of ordinary skill in the art, each microservice in a microservice choreography performs its actions independently and does not require any external instructions.

In another exemplary embodiment, microservices may relate to a software development architecture such as, for example, a service-oriented architecture which arranges a complex application as a collection of coupled modular services. The modular services may include small, independently versioned, and scalable customer-focused services with specific business goals, which communicate with other services over standard protocols with well-defined interfaces. In another exemplary embodiment, the microservices may utilize technology-agnostic communication protocols such as, for example, a Hypertext Transfer Protocol (HTTP) to communicate over a network and may be implemented by using different programming languages, databases, hardware environments, and software environments.

In another exemplary embodiment, the scenario may include an operational situation to test the microservice. The operational situation may include a postulated sequence of events relating to the functions of a microservice within a plurality of choreographed microservices. For example, the postulated sequence of events may relate to a function of the microservice, such as generating a user account from user information received from another microservice. In another exemplary embodiment, the scenario may include a postulated sequence of events relating to the business process of an entire microservices choreography. For example, the postulated sequence of events may relate to a business process, such as a customer opening a checking account or a savings account. In another exemplary embodiment, the scenario may include instructions in computer code that invokes an application programing interface (API), which passes the instruction set to a processor. The scenario instructions in computer code may include, for example:

```
{
    "scenarioDescription": "Send a CallMe event to the megatron-
        example_topic in KAFKA cluster NA100; get a Response event
        back.",
    "stepSequence": {
        "description": "SLA for the send/receive is 1000ms.",
        "sequence": [
            {
                "type": "SEND",
                "description": "Send the CallMe event with payload
                    specified inline as JSON.",
                "topic": "megatron-example_topic-na100",
                "payload": {
                    "source": "INLINE",
                    "schema": "com.chase.ccb.example.CallMe",
                    "json": "{\"name\": \"InlineWorld\"}"
                }
            },
            {
                "type": "RECEIVE",
                "description": "Receive the response to InlineWorld.",
                "topic": "megatron-example_topic-na100",
                "schema": "com.chase.ccb.example.Response",
                "timeoutInMs": 1000
            }
        ]
    }
}
```

In another exemplary embodiment, the scenario may be received over standard communication protocols such as, for example, a HTTP through a representation state transfer (REST) application programming interface (API). The standard communication protocol may serve as a two-way HTTP to/from an event bridge. In another exemplary embodiment, the HTTP REST API may be exposed though a communication interface and made available on an enterprise network. The ability to receive the scenario via a HTTP REST API may afford an easy path for the invocation of a microservice which may enable the testing of event-driven microservices in software development and information-technology operations (DevOps) pipelines for post deployment test automation. As will be appreciated by a person of ordinary skill in the art, the set of instructions to test the microservice may include any computer code or program code in any corresponding computer language.

At step S404, a production event relating to an action to be performed and a consumption event relating to a record of the performed action may be automatically generated based on the scenario. In an exemplary embodiment, the production event may detect or sense an event relating to an action to be performed and represents the event as a message. The production event may not know the consumer of the event or the outcome of the event. In another exemplary embodiment, the consumption event may process the event asynchronously via a processing platform. The event consumers may need to be informed when an event has occurred, as the event consumer may process the event or may only be impacted by the event. In another exemplary embodiment, the consumption event may execute the correct response to an event, record the performed action, and send the event downstream to the next set of producers and consumers. In another exemplary embodiment, the production event may include steps for generating events as a producer based on the scenario and the consumption event may include steps for listening to results as a consumer.

In another exemplary embodiment, instructions for the production event and the consumption event may be extracted from the received scenario and utilized to automatically generate production event code and automatically generate consumption event code. The production event code may include a standardized set of production code to invoke the microservice based on the received scenario. Once the microservice has been invoked, the microservice may generate an output event. The consumption event code may include a standardized set of consumption code that may listen in on the generated output event and confirm the generated output event.

At step S406, a test event may be automatically generated by using the production event. In an exemplary embodiment, the test event may be automatically generated based on the received scenario by using the production event. The test event may include a standardized synthetic representation of the received scenario that incorporates the production events. The test event may include synthetic events matching any particular schema with payload characteristics of a microservice in order to functionally test the microservice. In another exemplary embodiment, the test event may be uniquely identifiable so that the test event may be utilized to test a microservice after the microservice has already been operatively deployed in an enterprise network. The uniquely identifiable test event may enable correlation of events transmitted to a microservice and event received from the microservice for the derivation of performance metrics.

In another exemplary embodiment, a plurality of test events may be automatically generated in a relatively short amount of time based on instructions from the scenario. The large amount of test events may enable a load simulation of the microservice. In another exemplary embodiment, the test event may be automatically generated according to a predetermined schedule such as, for example, an intermittent schedule or a periodic schedule based on instructions from the scenario. The scheduled generation of test events may enable continuous testing of a microservice as well as continuous testing of a choreography of multiple event-driven microservices.

At step S408, the test event may be outputted to the microservice for execution. In an exemplary embodiment, an event broker may determine the particular microservice to send the test event based on the production event for a choreography of microservices. The determination of a particular microservice in a choreography of multiple event-driven microservices may enable integration testing of the choreography of microservices based on the scenario. As will be appreciated by a person of ordinary skill in the art, the test event may be transmitted to the microservice via any communication network described in the present disclosure.

At step S410, a result relating to the execution of the test event by the microservice may be automatically retrieved by using the consumption event. In an exemplary embodiment, the consumption event may observe and retrieve the results from execution of the test event. The consumption event may include instructions from the scenario relating to the microservice and any expected result. For example, the consumption event may include information relating to a particular microservice that creates a user account in a database before passing the user account on to the next microservice. Knowing that results from the particular microservice relates to the creation of a user account, the consumption event may observe and retrieve the resulting user account.

In another exemplary embodiment, the consumption event may automatically retrieve the result relating to the execution of the test event. For example, the consumption event may include information relating to a particular microservice that creates a user account in a database before passing the user account on to the next microservice. Knowing that results from the particular microservice relates to the creation of a test user account, the consumption event may automatically observe and retrieve the resulting test user account.

At step S412, the result may be validated based on the scenario. As described above, the result from the microservice may be observed and retrieved by the consumption event. In an exemplary embodiment, the result retrieved may be validated based on an expected result from the scenario. For example, in the evaluation of an account creation microservice using a test event, the expected result may include a newly created account based on the test event. The result retrieved from the account creation microservice may be compared to the expected result to validate the functionality of the account creation microservice.

In another exemplary embodiment, the result relating to the execution of the test event may be displayed on a graphical user interface of a user device. The result may be displayed on the graphical user interface in formats such as, for example, a textual representation of the result and a graphical representation of the result. In another exemplary embodiment, a notification based on an outcome of the validating may be displayed on the graphical user interface. The notification may be displayed separately from the result or displayed together with the result on the graphical user interface. In another exemplary embodiment the notification may include textual information and alerts such as, for example, an audible alert and a visual alert.

In another exemplary embodiment, the graphical user interface may include a visualization relating to a choreography of the tested microservice. The visualization may include a graphical representation of the tested microservices, other microservices in the same choreography as the tested microservices, and any interactions between the microservices. In another exemplary embodiment, the result relating to the execution of the test event may include information relating to the microservices in the choreography. Based on the information, dependencies and interactions between the tested microservices and other microservices in the choreography may be derived or extrapolated.

In another exemplary embodiment, a second test event based on a predetermined schedule may be automatically generated by using the production event. The predetermined schedule may include an intermittent schedule such as, for example, when the microservice is below a predetermined utilization threshold and a periodic schedule such as, for example, once a week during nonbusiness hours. Then, the second test event may be transmitted to the microservice for execution. Once the microservice has processed the second test event, a second result relating to the execution of the second test event may be automatically retrieved by the consumption event. The second result may be validated based on the scenario and an outcome of the validation may be stored in a log corresponding to the scenario. The log may include the outcomes of the validation for each occurrence of the validation based on the predetermined schedule. The log may be displayable on a graphical user interface based on user preference.

In another exemplary embodiment, a plurality of third test events may be automatically generated by using the production event. The production event generated from the scenario may include instructions relating to a number for the plurality of third test events such as, for example, one thousand third test events and a time period such as, for example, in one hour for the generation of the plurality of third test events. Then, the plurality of third test events may be transmitted to the microservice for execution. Once the microservice has processed the plurality of third test events, a measurement of a parameter relating to performance of the microservice may be retrieved. In another exemplary embodiment, the measurement may include system operating statistics such as, for example, a percentage of processor utilization under load and a percent of processing speed degradation under load as well as system functionality statistics such as, for example, error related metrics. The retrieved measurement may be stored in an electronic document corresponding to the scenario. The measurement may be displayable on a graphical user interface based on user preference.

Figure 5:
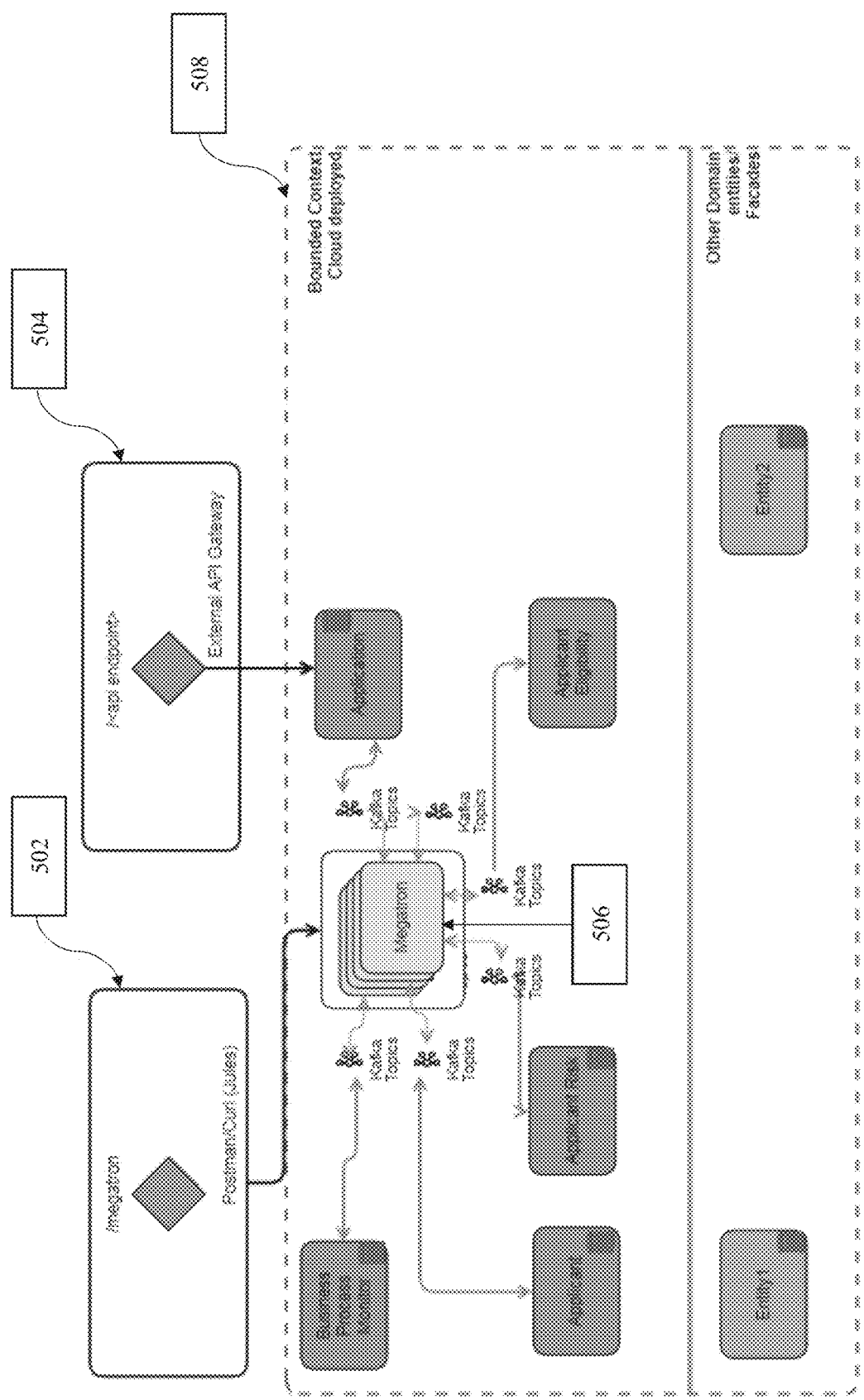
FIG. 5 is a flow diagram of an exemplary system for implementing a method for providing a standardized tool for automated testing of event-driven microservices in multi-application choreographies.

FIG. 5 is a flow diagram 500 of an exemplary system for implementing a method for providing a standardized tool for automated testing of event-driven microservices in multi-application choreographies. The illustrated system shown in FIG. 5 includes a processing unit 506 operating in an originations bounded context of a networked operating environment 508. Networked operating environment 508 includes other domain entities and facades such as, for example, domains titled "Entity1" and "Entity2."

As illustrated in FIG. 5, the processing unit 506 may receive a scenario via a Uniform Resource Locator (URL) from an API testing environment and command line tool 502. The API testing environment and command line tool 502 may include API testing environments such as, for example, a Postman test environment and command line tools such as, for example, a client URL (cURL) command line tool. Additionally, the processing unit 506 may also receive a scenario via external API gateway 504 through an application operating in networked operating environment 508. The processing unit 506 may integrate multi-subscriber topics in a plurality of partitions and the topics may include any number of consumers that subscribe to the data written to the topic. As illustrated, the multi-subscriber topics may include "Business Process Monitor," "Applicant," "Applicant Risk," and "Applicant Eligibility."

The processing unit 506 then processes the received scenario according to embodiments described in the present disclosure. A result of the processing may pass to an Application Performance Management (APM), which monitors and manages performance and availability of software applications. The APM may utilize flows Business Process Model and Notation (BPMN) to graphically represent a specific business process in a business process model. The APM may transmit BPMN adherence logs to a database for storage using a database integration and monitoring software such as, for example, SPLUNK Database (DB) Connect. Finally, an APM dashboard may be utilized to access information stored in the database.

Figure 6:
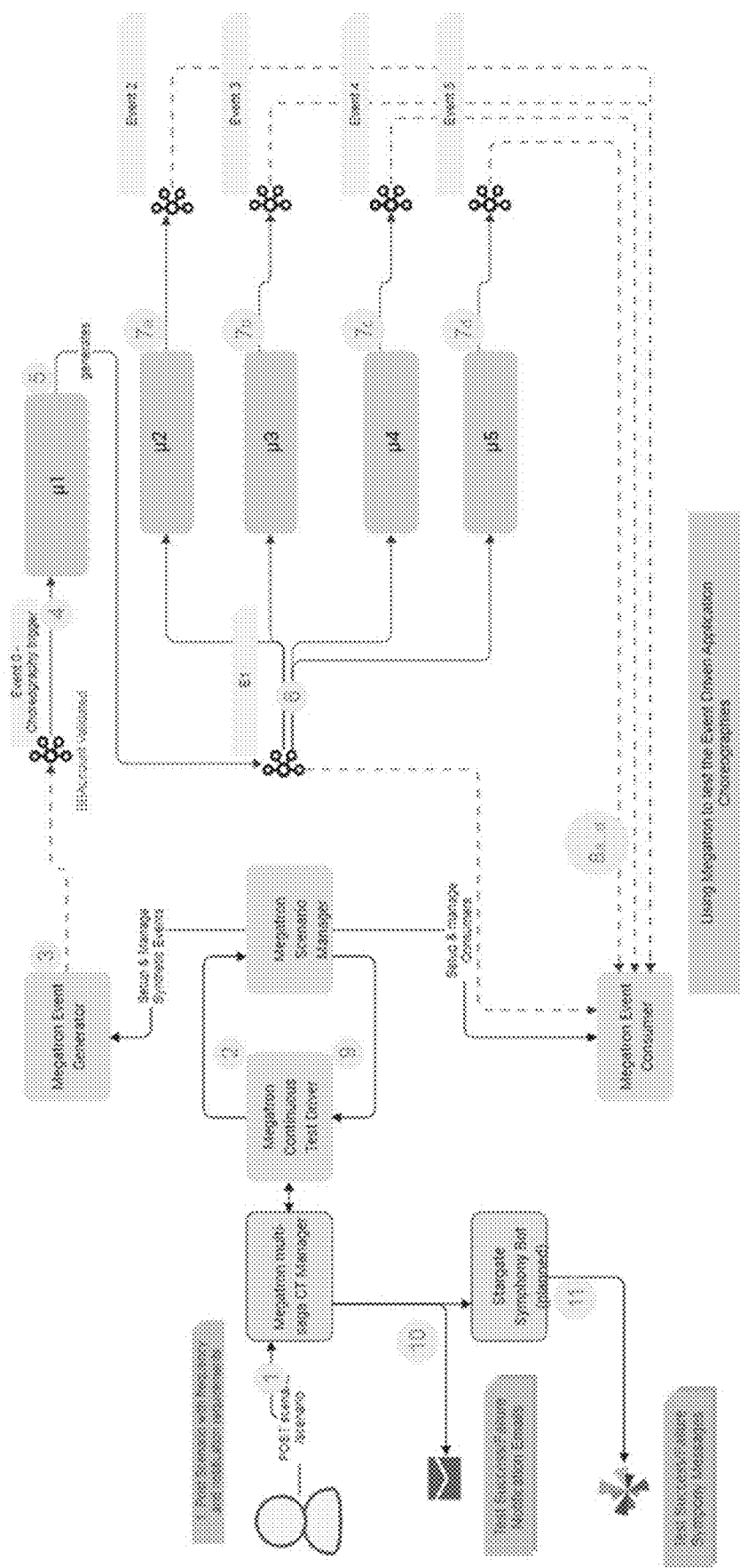
FIG. 6 is a flow diagram of an exemplary process for implementing a method for providing a standardized tool for automated testing of event-driven microservices in multi-application choreographies.

FIG. 6 is a flow diagram 600 of an exemplary process for implementing a method for providing a standardized tool for automated testing of event-driven microservices in multi-application choreographies. In step 1 of FIG. 6, a scenario with frequency and notification requirements may be received from a user at a multi-saga continuous testing (CT) manager. At step 2, a continuous test driver determines whether the received scenario is a new scenario or a part of a scenario currently under testing. When the scenario is a new scenario, the continuous test driver transmits the scenario to a scenario manager. The scenario manager may setup and manage synthetic events, which are then transmitted to an event generator at step 3. At step 4, the user account may be validated, and the generated event sent to a choreography trigger. The choreography trigger determines the appropriate microservice in a choreography to send the generated events.

As illustrated in FIG. 6 at step 5, the generated event is processed by the first microservice. The output generated by the first microservice may include event one and may be sent to a topic at step 6. When a determination is made that several subscribing microservices are included in the scenario, the output from the first microservice may be transmitted to the subscribing microservices in steps 7a-7d. In FIG. 6, the subscribing microservice may include a second microservice, a third microservice, a fourth microservice, and a fifth microservice. Once processed by the subscribing microservices, corresponding events such as event two, event three, event four, and event five may be generated. At step 8a-8d, an event consumer may be utilized to test the event-driven application choreographies. In another exemplary embodiment, the event consumer may be utilized to test the event-driven microservice when a determination is made that no other subscribing microservice is included in the scenario. At step 9, the scenario manager and the continuous test driver may setup and manage consumers for the event consumer when a continuous testing of the scenario is determined.

At step 10 of FIG. 6, a user may be notified of a result of the test. The notification may include a test success and a test failure notification email sent to the user associated with the scenario. The notification may also include messages informing the user that the test has been completed. At step 11, an autonomous program on a network may interact with the user via an enterprise messaging interface to provide test success and test failure messages. The autonomous program may be designed to respond and interact with the user. For example, the user may request additional details for the test message in natural language format. Then, the autonomous program may process the natural language request and display the requested additional details for the user.

Figure 7:
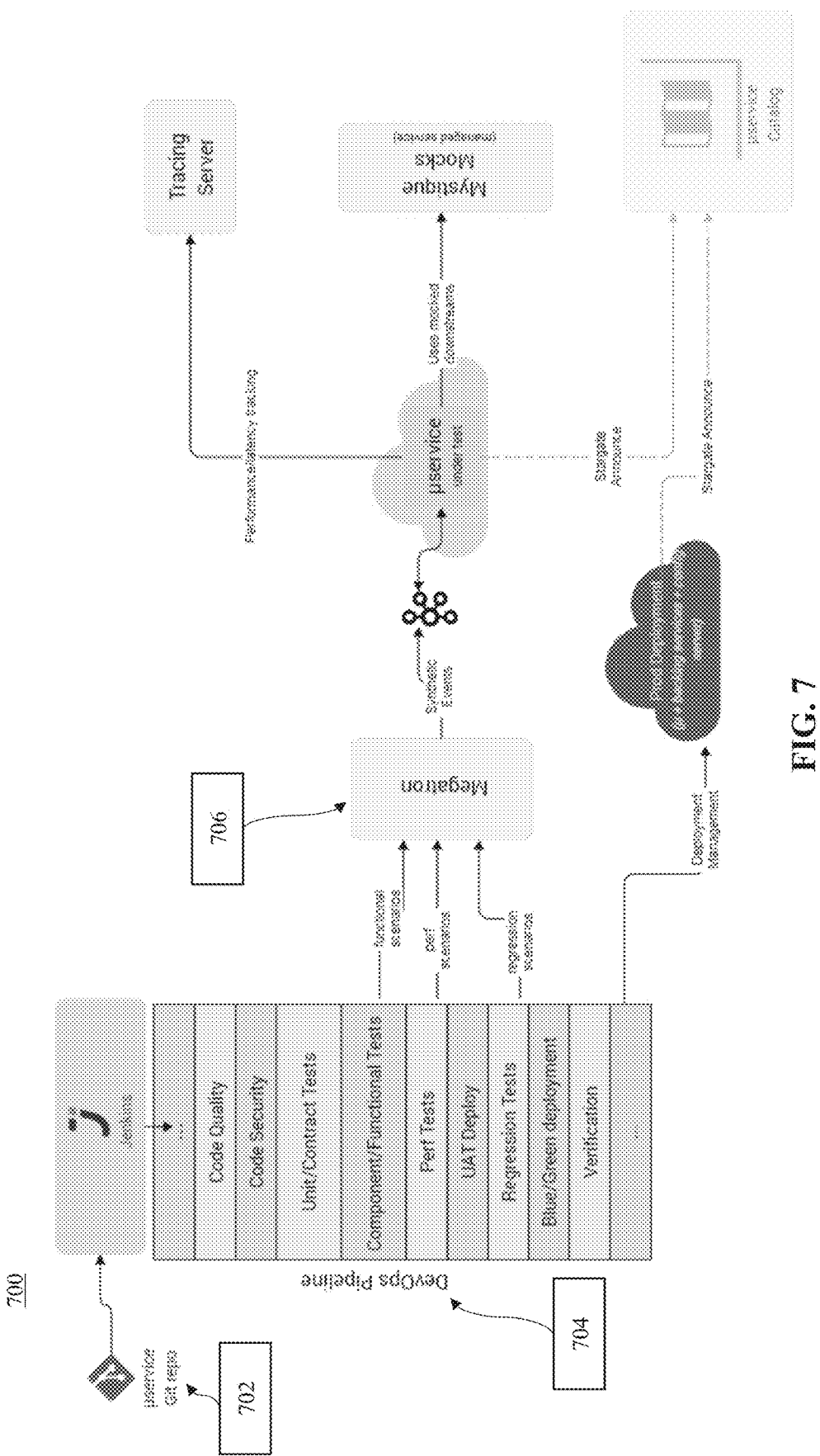
FIG. 7 is a flow diagram of an exemplary process for implementing a method for providing a standardized tool for automated testing of event-driven microservices in a continuous integration and continuous deployment environment.

FIG. 7 is a flow diagram 700 of an exemplary process for implementing a method for providing a standardized tool for automated testing of event-driven microservices in a continuous integration and continuous deployment environment. In FIG. 7 the testing of event-driven microservices in an automated microservices development environment is illustrated.

In FIG. 7, a standardized framework for the development of a microservice may be obtained from a code repository 702. The standardized framework is transmitted to an autonomous development pipeline 704, which includes continuous integration and continuous development servers. The autonomous development pipeline 704 may include processes for the development of a microservice based on the standardized framework. The processes may include code quality, code security, unit/contract tests, component/functional tests, performance tests, user acceptance testing (UAT) deployment, regression tests, blue/green deployment, and verification. The component/functional tests may output functional scenarios to a processing unit 706. Additionally, the performance tests may output performance scenarios to the processing unit 706 and the regression tests may output regression scenarios to the processing unit 706. Processing unit 706 may utilize any embodiment described in the present application to process the scenarios and perform the desired tests on a selection of microservices. Processing unit 706 may output synthetic events to a choreography of microservices for further testing. The synthetic events may be utilized by a microservice under test object such as, for example, a data access object (DAO) layer for further testing, for performance/latency tracking, and for announcements to a microservices catalog. The DAO layer may also use mocked downstreams for managed services.

As illustrated in FIG. 7, autonomous development pipeline 704 may output a completed microservice to a deployment manager in a cloud environment. The cloud-based data access object (DAO) production deployment layer may include the developed microservice, backing services, and configuration servers. The DAO production deployment layer may announce the microservice to a catalog of microservices.

Figure 8:
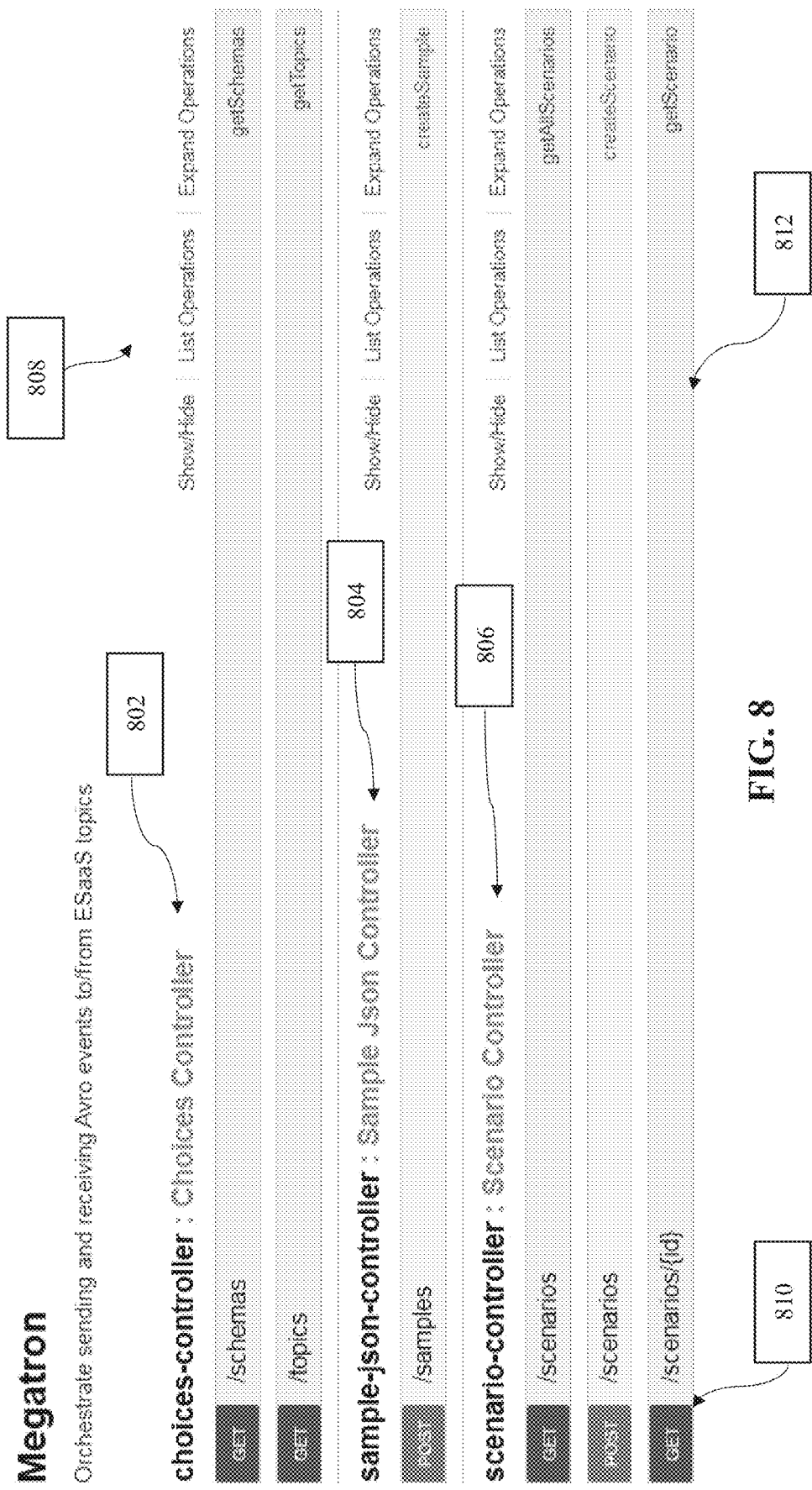
FIG. 8 is a screen shot that illustrates an application programming interface that is usable for implementing a method for providing a standardized tool for automated testing of event-driven microservices in multi-application choreographies, according to an exemplary embodiment.

FIG. 8 is a screen shot that illustrates an application programming interface (API) that is usable for implementing a method for providing a standardized tool for automated testing of event-driven microservices in multi-application choreographies, according to an exemplary embodiment. The API shown in FIG. 8 is divided into three sections, sections 802, 804, and 806, with each section having a header titled "choices-controller: Choices Controller," "sample-json-controller: Sample Json Controller," and "scenario-controller: Scenario controller," respectively. Each section may include selectable configuration texts 808 which includes "show/hide," "list operations," and "expand operations." Each section may also include selectable graphical buttons 810 titled "Get" and "Post" to retrieve and submit computer code based on information provided in editable text boxes 812. The API may be usable by a user to submit and retrieve computer code relating to schemas, topics, JavaScript Object Notation (JSON), and scenarios.

As illustrated in FIG. 8, section 802 is titled "choices-controller: Choices Controller" and includes selectable graphical buttons 810 to retrieve schemas and topics based on provided input. Section 804 is titled "sample-json-controller: Sample Json Controller" and includes a selectable graphical button 810 to submit computer code and create a JSON code. Section 806 is titled "scenario-controller: Scenario Controller" and includes selectable graphical buttons 810 to get all scenarios, create a scenario, and get a particular scenario based on provided input.

Accordingly, with this technology, an optimized process for providing a standardized tool for automated testing of event-driven microservices in multi-application choreographies is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for facilitating automated testing of event-driven microservices, the method being implemented by at least one processor, the method comprising:
   receiving, by the at least one processor via a representational state transfer application programming interface, at least one scenario that includes at least one set of instructions to test at least one microservice, the at least one scenario including at least one frequency requirement and at least one notification requirement,
      wherein the representational state transfer application programming interface is exposed through a communication interface and made available on an enterprise network; and
      wherein the at least one microservice is invoked via the representational state transfer application programming interface to enable post deployment test automation;
   determining, by the at least one processor, that the at least one scenario is not currently under testing;
   automatically generating, by the at least one processor based on the at least one scenario, at least one production event relating to at least one action to be performed and at least one consumption event relating to at least one record of the performed action,
      wherein the at least one production event detects a plurality of events that relate to the at least one action to be performed and represents each of the plurality of events as a message, and
      wherein the at least one consumption event asynchronously processes each of the plurality of events to execute a response to the plurality of events, log the performed action of the plurality of events, and send the plurality of events downstream to a subsequent set of a producer and a consumer;
   automatically generating, by the at least one processor using the at least one production event, at least one first test event, the at least one first test event including a standardized synthetic representation of the received at least one scenario that incorporates the automatically generated at least one production event;
   validating, by the at least one processor, a user account in response to determining that the at least one scenario is not currently under testing;
   identifying, by the at least one processor in response to validating the user account, the at least one microservice to be tested in a choreography of multiple event-driven microservices by using the generated at least one production event;
   outputting, by the at least one processor, the at least one first test event to the at least one microservice based on a result of the identifying;
   automatically retrieving, by the at least one processor using the at least one consumption event, at least one first result relating to the execution of the at least one first test event by the at least one microservice, the at least one first result including information that corresponds to the multiple event-driven microservices in the choreography;
   validating, by the at least one processor, the at least one first result based on the at least one scenario;
   extrapolating, by the at least one processor, dependency data and interaction data for each of the multiple event-driven microservices in the choreography by using the information in the at least one first result;
   providing, by the at least one processor, a notification email to a user associated with the at least one scenario, the notification email relating to the at least one first result;
   providing, by the at least one processor via an enterprise messaging interface, an automated message to the user, the automated message including at least one from among a test success message and a test failure message;
   receiving, by the at least one processor via the enterprise messaging interface, a request from the user in response to the automated message, the request including an informational request for additional details in a natural language format; and
   automatically displaying, by the at least one processor via the enterprise messaging interface, the additional details for the user in response to the request.

2. The method of claim 1, further comprising displaying, via a graphical user interface, the at least one first result and at least one notification based on an outcome of the validating.

3. The method of claim 1, further comprising displaying, via a graphical user interface, a choreography of the at least one microservice that is generated based on the at least one first result, the choreography including derived dependencies and interactions between the at least one microservice and other microservices.

4. The method of claim 1, further comprising:
   automatically generating, by the at least one processor using the at least one production event, at least one second test event based on a predetermined schedule;
   outputting, by the at least one processor, the at least one second test event to the at least one microservice;
   automatically retrieving, by the at least one processor using the at least one consumption event, at least one second result relating to the execution of the at least one second test event by the at least one microservice; and validating, by the at least one processor, the at least one second result based on the at least one scenario.

5. The method of claim 4, further comprising:
storing, by the at least one processor, an outcome of the validating in a log corresponding to the at least one scenario; and
displaying, by the at least one processor via a graphical user interface, the log.

6. The method of claim 4, wherein the predetermined schedule includes at least one from among an intermittent schedule and a periodic schedule.

7. The method of claim 1, further comprising:
automatically generating, by the at least one processor using the at least one production event, a plurality of third test events;
outputting, by the at least one processor, the plurality of third test events to the at least one microservice;
retrieving, by the at least one processor, a measurement of at least one parameter relating to performance of the at least one microservice; and
storing, by the at least one processor in a memory, the measurement in an electronic document corresponding to the at least one scenario.

8. The method of claim 7, wherein the at least one first result and the measurement are displayed on a graphical user interface.

9. The method of claim 1, wherein the at least one scenario includes at least one operational situation to test the at least one microservice, the operational situation including a postulated sequence of procedures for the at least one microservice.

10. The method of claim 1, wherein the at least one scenario is received via at least one from among a hypertext transfer protocol and an application programing interface.

11. A computing device configured to implement an execution of a method for facilitating automated testing of event-driven microservices, the computing device comprising:
a processor;
a memory; and
a communication interface coupled to each of the processor and the memory,
wherein the processor is configured to:
receive, via a representational state transfer application programming interface, at least one scenario that includes at least one set of instructions to test at least one microservice, the at least one scenario including at least one frequency requirement and at least one notification requirement,
wherein the representational state transfer application programming interface is exposed through the communication interface and made available on an enterprise network; and
wherein the at least one microservice is invoked via the representational state transfer application programming interface to enable post deployment test automation;
determine that the at least one scenario is not currently under testing;
automatically generate, based on the at least one scenario, at least one production event relating to at least one action to be performed and at least one consumption event relating to at least one record of the performed action,
wherein the at least one production event detects a plurality of events that relate to the at least one action to be performed and represents each of the plurality of events as a message, and
wherein the at least one consumption event asynchronously processes each of the plurality of events to execute a response to the plurality of events, log the performed action of the plurality of events, and send the plurality of events downstream to a subsequent set of a producer and a consumer;
automatically generate, by using the at least one production event, at least one first test event, the at least one first test event including a standardized synthetic representation of the received at least one scenario that incorporates the automatically generated at least one production event;
validate a user account in response to determining that the at least one scenario is not currently under testing;
identify, in response to validating the user account, the at least one microservice to be tested in a choreography of multiple event-driven microservices by using the generated at least one production event;
output the at least one first test event to the at least one microservice based on a result of the identifying;
automatically retrieve, by using the at least one consumption event, at least one first result relating to the execution of the at least one first test event by the at least one microservice, the at least one first result including information that corresponds to the multiple event-driven microservices in the choreography;
validate the at least one first result based on the at least one scenario;
extrapolate dependency data and interaction data for each of the multiple event-driven microservices in the choreography by using the information in the at least one first result;
provide a notification email to a user associated with the at least one scenario, the notification email relating to the at least one first result;
provide, via an enterprise messaging interface, an automated message to the user, the automated message including at least one from among a test success message and a test failure message;
receive, via the enterprise messaging interface, a request from the user in response to the automated message, the request including an informational request for additional details in a natural language format; and
automatically display, via the enterprise messaging interface, the additional details for the user in response to the request.

12. The computing device of claim 11, wherein the processor is further configured to display, via a graphical user interface, the at least one first result and at least one notification based on an outcome of the validating.

13. The computing device of claim 11, wherein the processor is further configured to display, via a graphical user interface, at least one visualization relating to a choreography of the at least one microservice based on the at least one first result, the choreography including derived dependencies and interactions between the at least one microservice and other microservices.

14. The computing device of claim 11, wherein the processor is further configured to:

automatically generate, by using the at least one production event, at least one second test event based on a predetermined schedule;

output the at least one second test event to the at least one microservice;

automatically retrieve, by using the at least one consumption event, at least one second result relating to the execution of the at least one second test event by the at least one micro service; and validate the at least one second result based on the at least one scenario.

15. The computing device of claim 14, wherein the processor is further configured to:

store an outcome of the validating in a log corresponding to the at least one scenario; and display, via a graphical user interface, the log.

16. The computing device of claim 14, wherein the predetermined schedule includes at least one from among an intermittent schedule and a periodic schedule.

17. The computing device of claim 11, wherein the processor is further configured to:

automatically generate, by using the at least one production event, a plurality of third test events;

output the plurality of third test events to the at least one microservice;

retrieve a measurement of at least one parameter relating to performance of the at least one micro service; and store the measurement in an electronic document corresponding to the at least one scenario.

18. The computing device of claim 17, wherein the processor is further configured to display, via a graphical user interface, the at least one first result and the measurement.

19. The computing device of claim 11, wherein the at least one scenario includes at least one operational situation to test the at least one microservice, the operational situation including a postulated sequence of procedures for the at least one microservice.

20. The computing device of claim 11, wherein the processor is further configured to receive the at least one scenario via at least one from among a hypertext transfer protocol and an application programing interface.

* * * * *